(12) United States Patent
Seth et al.

(10) Patent No.: US 8,021,449 B2
(45) Date of Patent: Sep. 20, 2011

(54) HYDROPHILIC AND HYDROPHOBIC SILANE SURFACE MODIFICATION OF ABRASIVE GRAINS

(75) Inventors: Anuj Seth, Marlborough, MA (US); Ying Cai, Shrewsbury, MA (US)

(73) Assignees: Saint-Gobain Abrasives, Inc., Worcester, MA (US); Saint-Gobain Abrasifs, Conflans-Sainte Honorine (FR)

( * ) Notice: Subject to any disclaimer, the term of this patent is extended or adjusted under 35 U.S.C. 154(b) by 119 days.

(21) Appl. No.: 12/386,360

(22) Filed: Apr. 16, 2009

(65) Prior Publication Data

US 2009/0260297 A1 Oct. 22, 2009

Related U.S. Application Data

(60) Provisional application No. 61/124,618, filed on Apr. 18, 2008.

(51) Int. Cl.
*B24D 3/00* (2006.01)
*B24D 3/34* (2006.01)
*C04B 35/628* (2006.01)
*C09K 3/14* (2006.01)

(52) U.S. Cl. ............... 51/293; 51/295; 51/298; 51/307; 51/308; 51/309

(58) Field of Classification Search .................... 51/293, 51/295, 298, 307, 308, 309
See application file for complete search history.

(56) References Cited

U.S. PATENT DOCUMENTS

| | | | |
|---|---|---|---|
| 3,098,730 A | 7/1963 | Rowse | |
| 4,543,107 A | 9/1985 | Rue | |
| 4,871,376 A | 10/1989 | DeWald | |
| 4,898,597 A | 2/1990 | Hay | |
| 5,014,468 A * | 5/1991 | Ravipati et al. ........... | 51/295 |
| 5,025,723 A | 6/1991 | Abendroth et al. | |
| 5,042,991 A | 8/1991 | Kunz et al. | |
| 5,094,672 A | 3/1992 | Giles, Jr. et al. | |
| 5,095,665 A | 3/1992 | Nagata et al. | |
| 5,114,475 A | 5/1992 | Siegmund et al. | |
| 5,203,886 A | 4/1993 | Sheldon et al. | |
| 5,213,589 A | 5/1993 | Ronning et al. | |
| 5,401,284 A | 3/1995 | Sheldon et al. | |
| 5,527,368 A | 6/1996 | Supkis et al. | |
| 5,536,283 A | 7/1996 | Sheldon et al. | |
| 5,709,598 A | 1/1998 | Nishio et al. | |
| 5,711,774 A | 1/1998 | Sheldon | |
| 5,851,247 A | 12/1998 | Stoetzel et al. | |
| 5,863,308 A | 1/1999 | Qi et al. | |
| 6,110,241 A | 8/2000 | Sung | |
| 6,797,023 B2 | 9/2004 | Knapp et al. | |
| 6,855,759 B2 * | 2/2005 | Kudo et al. ............... | 524/261 |
| 2003/0005646 A1 | 1/2003 | McHale, Jr. | |
| 2003/0134950 A1 * | 7/2003 | Kudo et al. ............... | 524/262 |
| 2003/0166387 A1 | 9/2003 | Chen et al. | |
| 2004/0224426 A1 | 11/2004 | Cooper et al. | |
| 2005/0113005 A1 | 5/2005 | Woo et al. | |
| 2008/0172951 A1 | 7/2008 | Starling | |
| 2009/0165395 A1 * | 7/2009 | Ikeda et al. .............. | 51/309 |

FOREIGN PATENT DOCUMENTS

| | | |
|---|---|---|
| GB | 643964 | 10/1950 |
| GB | 781351 | 8/1957 |
| GB | 850419 | 10/1960 |
| JP | 60-240769 A2 | 11/1985 |

OTHER PUBLICATIONS

Written Opinion of the International Searching Authority for related foreign application PCT/US2009/040797, mailed on Nov. 30, 2009.
International Search Report for related foreign application PCT/US2009/040797, mailed on Nov. 30, 2009.

* cited by examiner

*Primary Examiner* — Elizabeth D Wood
(74) *Attorney, Agent, or Firm* — Abel Law Group, LLP; Joseph P. Sullivan

(57) ABSTRACT

A surface-modified abrasive grain includes an abrasive grain as a substrate, and a film on the abrasive grain that includes a relatively hydrophilic silane component and a relatively hydrophobic silane component. The film can be a single film layer or multiple film layers, wherein a film layer most proximal to the abrasive grain has a predominately hydrophilic silane component, and a film layer more distal to the abrasive grain includes predominately a relatively hydrophobic silane component. Coated abrasive products and bonded abrasive products include the surface-modified abrasive grains.

31 Claims, 7 Drawing Sheets

Testing Result for Formulation #1
30 lbs on Loesser

Confidential Information - Property of Saint-Gobain Abrasives

| Part # | MRR, g/part | | CMR, g | | Surface finish, u inch | | Abrasive loss, % | |
|---|---|---|---|---|---|---|---|---|
| | W/ silane treatment | w/o silane treatment | W/ silane treatment | w/o silane treatment | W/ silane treatment | w/o silane treatment | W/ silane treatment | w/o silane treatment |
| 1 | 32.89 | 26.36 | 32.89 | 26.36 | 80.87 | 62.47 | 11.35 | 24.62 |
| 2 | 30.48 | 24.07 | 63.37 | 50.43 | 77.70 | 66.43 | 12.77 | 28.41 |
| 5 | 27.37 | 21.86 | 150.15 | 119.32 | 83.37 | 63.07 | 17.02 | 35.98 |
| 10 | 26.30 | 20.34 | 284.32 | 224.82 | 69.73 | 65.40 | 20.57 | 45.45 |
| 15 | 26.08 | 19.39 | 415.27 | 324.15 | 71.47 | 52.57 | 24.11 | 50.19 |
| 20 | 25.03 | 18.80 | 543.04 | 419.62 | 71.77 | 54.20 | 25.53 | 51.14 |
| 40 | 25.08 | 21.56 | 1044.15 | 823.23 | 73.57 | 49.80 | 29.79 | 60.61 |
| 60 | 22.92 | 17.83 | 1524.15 | 1217.13 | 68.93 | 35.83 | 34.04 | 66.29 |
| 80 | 21.87 | 15.66 | 1972.05 | 1552.03 | 62.53 | 39.07 | 36.88 | 68.18 |
| 100 | 20.58 | 14.10 | 2396.55 | 1849.63 | 59.53 | 30.73 | 38.30 | 68.18 |
| 120 | 20.54 | 13.81 | 2807.75 | 2128.72 | 58.10 | 34.75 | 38.30 | 69.13 |
| 140 | 19.33 | 11.92 | 3206.45 | 2386.02 | 55.07 | 32.67 | 39.72 | 73.86 |
| 160 | 18.89 | 9.09 | 3588.64 | 2596.12 | 51.40 | 38.57 | 42.55 | 73.86 |
| 180 | 18.50 | 10.26 | 3962.54 | 2789.62 | 48.83 | 36.40 | 42.55 | 73.86 |
| 200 | 19.05 | 9.34 | 4338.04 | 2985.62 | 51.27 | 38.87 | 45.39 | 73.86 |
| Average after 20 parts | 21.18 | 14.24 | | | 60.10 | 39.09 | | |

FIG. 3A

50 lbs on Loesser

| Part # | MRR, g/part | | CMR, g | | Surface finish, u inch | | Abrasive loss, % | |
|---|---|---|---|---|---|---|---|---|
| | W/ silane treatment | w/o silane treatment | W/ silane treatment | w/o silane treatment | W/ silane treatment | w/o silane treatment | W/ silane treatment | w/o silane treatment |
| 1 | 57.29 | 32.10 | 57.29 | 32.10 | 104.33 | 74.10 | 16.30 | 30.08 |
| 2 | 47.60 | 28.02 | 104.89 | 60.12 | 84.03 | 82.97 | 19.26 | 33.08 |
| 5 | 44.67 | 25.34 | 243.30 | 140.16 | 85.90 | 71.60 | 23.70 | 42.11 |
| 10 | 39.08 | 22.94 | 452.67 | 260.86 | 81.20 | 70.60 | 29.63 | 52.63 |
| 15 | 36.78 | 21.80 | 642.32 | 372.71 | 79.50 | 61.60 | 35.56 | 57.14 |
| 20 | 33.91 | 22.03 | 819.05 | 482.28 | 77.60 | 58.93 | 40.00 | 61.65 |
| 40 | 33.11 | 20.49 | 1489.25 | 907.48 | 75.80 | 59.87 | 54.81 | 66.17 |
| 60 | 32.08 | 17.07 | 2141.15 | 1283.08 | 64.57 | 42.43 | 59.26 | 70.68 |
| 80 | 30.99 | 18.06 | 2771.85 | 1634.38 | 62.30 | 42.63 | 62.22 | 75.19 |
| 100 | 27.24 | 15.45 | 3354.15 | 1969.48 | 52.97 | 41.73 | 63.70 | 76.69 |
| 120 | 27.38 | 16.67 | 3900.35 | 2290.68 | 49.00 | 56.90 | 66.67 | 78.20 |
| 140 | 24.39 | 13.50 | 4418.05 | 2592.38 | 51.60 | 49.37 | 71.11 | 79.70 |
| 160 | 24.55 | 14.31 | 4907.45 | 2870.48 | 46.97 | 50.67 | 71.11 | 79.70 |
| 180 | 20.82 | 11.38 | 5361.15 | 3127.38 | 43.20 | 43.80 | 71.11 | 79.70 |
| 200 | 22.08 | 11.84 | 5790.15 | 3359.58 | 42.70 | 38.53 | 71.11 | 79.70 |
| Average after 20 parts | 27.66 | 16.08 | | | 56.67 | 48.49 | | |

FIG. 4A

| | 30 lbs | | | 50 lbs | | | 30 lbs | | | 50 lbs | | |
|---|---|---|---|---|---|---|---|---|---|---|---|---|
| | Avg. MRR part 20 - 200, g/part | CMR at part 200, g | Abrasive loss at part 200, % | Avg. MRR part 20 - 200, g/part | CMR at part 200, g | Abrasive loss at part 200, % | Normalized Avg. MRR | Normalized CMR | Normalized Abrasive loss | Normalized Avg. MRR | Normalized CMR | Normalized Abrasive loss |
| W/ silane treatment | 21.18 | 4338.04 | 45.39 | 27.66 | 5790.15 | 71.11 | 1.487602725 | 1.452977182 | 0.614512 | 1.719838 | 1.72347 | 0.892243 |
| w/o silane treatment | 14.24 | 2985.62 | 73.86 | 16.08 | 3359.58 | 79.70 | 1 | 1 | 1 | 1 | 1 | 1 |

HYDROPHILIC AND HYDROPHOBIC SILANE SURFACE MODIFICATION OF ABRASIVE GRAINS

RELATED APPLICATION(S)

This application claims the benefit of U.S. Provisional Application No. 61/124,618, filed on Apr. 18, 2008. The entire teachings of the above application are incorporated herein by reference.

BACKGROUND OF THE INVENTION

Wet grinding operations, defined by grinding processes using water-based coolant systems, have been found to be hampered with shorter life of the abrasive product as compared with dry grinding applications. This phenomenon typically has been addressed by addition of sealant in the formulation of make resin employed in the abrasive. Chemicals added to the make resin to counteract the effect of water generally include hydrophobic molecules that increase hydrophobicity of the make resin to thereby reduce the intake of water, to retard swelling of the resin system consequent to deterioration of mechanical properties, and to retard abrasive loss. Examples of hydrophobic molecules typically are siloxanes and organo-functional silanes (hereinafter referred to as "silanes") or other organic molecules that have hydrophobic moieties, such as vinyl bonds, and sulfur or fluorine atoms in the organic molecule. However, inclusion of hydrophobic components in the make resin often does not protect abrasive particles upon contact with water, thereby permitting water over extended use periods to migrate along abrasive particles until the abrasive tool fails. In the case of coated abrasive products, contact of the backing material with water employed as a coolant can cause separation of the abrasive and make coat from the backing material.

In one alternative, abrasive particles are first treated by applying a coating of a silane. Hydrolysis of the silane at a surface of an abrasive particle can cause formation of covalent bonds, particularly where the abrasive particle is a metal. However, formation of a hydrophilic coating on grains can reduce the strength with which particles are held in place by the make coat, particularly where the make coat includes a hydrophobic component, such as a hydrophobic silane component.

Therefore, a need exists for abrasive particles, coated abrasive products and other grinding tools, such as bonded abrasive tools, that overcome or minimize the above-referenced problems.

SUMMARY OF THE INVENTION

The invention generally is directed to surface-modified abrasive grains, coated abrasive products, bonded abrasive products, and methods of manufacturing and using the grains and abrasive products. In one embodiment, the invention is a surface-modified abrasive grain that includes an abrasive grain substrate and a film on the abrasive grain that includes a relatively hydrophilic silane component and a relatively hydrophobic silane component. The relatively hydrophilic silane component, in one embodiment, can be one member selected from the group consisting of amines, diamines, triamines, azine, azol, ureido, isocyanate, alkoxy, acetoxy, oximino, chloro, morpholinyl and piperazinyl silanes, and the relatively hydrophobic silane can be one member selected from the group consisting of vinyl silanes, methacrylate silanes, sulfur silanes, mercapto silanes, epoxy silanes and phenyl silanes. The film can be either a single layer that includes a combination of relatively hydrophilic and relatively hydrophobic silane components. In this embodiment, polymers of the relatively hydrophilic and hydrophobic components can be distinct polymers, or co-polymers of the relatively hydrophilic and relatively hydrophobic silane components. Typically, the abrasive grain substrate includes at least one member selected from the group consisting of aluminum oxide, silicon carbide, fused ceramics, alloy abrasives, sol-gels, ceramic grains and super abrasives.

In another specific embodiment, the coating of the abrasive particles includes two layers, the first of which is most proximate to the abrasive particle and includes at least one relatively hydrophilic silane component. The second layer is distal, and generally applied over the first layer. The second layer includes at least one silane component that is hydrophobic relative to the silane component of the first layer.

In another embodiment, the invention is a coated abrasive product that includes surface-modified abrasive grains of the invention. In still another embodiment, the invention is bonded abrasive product employing the surface-modified abrasive particles of the invention.

A surface-modified abrasive grain of the invention can be formed, in one embodiment, by combining a relatively hydrophilic and relatively hydrophobic silane components to form a mixture. The mixture is then combined with a carrier that includes water to form a silane solution. At least a portion of the silane component is hydrolyzed to form a hydrolyzed solution, which is then blended with an abrasive grain component to thereby form the surface-modified abrasive grain.

A method of forming a coated abrasive product of the invention includes combining the surface-modified abrasive grains of the invention with a resin and then applying the combined surface-modified abrasive grains and resin to a backing. The resin is then cured, thereby forming the coated abrasive product.

A method of making a bonded abrasive product of the invention includes combining surface-modified abrasive grains of the invention with a resin or a vitreous glass bond along with a binder. The resulting green compound is molded or formed into the desired shape and subsequently thermally cured or fired to result in the final product.

Other embodiments of the invention include grinding or cutting a workpiece employing a coated or bonded abrasive product of the invention.

The invention has many advantages. For example, the relatively hydrophilic silane component of the film is believed to effectively seep into most types of abrasive particles, thereby facilitating wetting of the component with a sealant that includes the relatively hydrophilic silane component. In addition, it is believed that the same film forms covalent bonds that bind the sealant tightly to the particle. In addition, the relative hydrophobic silane component of the film can either be blended with the relatively hydrophilic silane component or applied as a separate film that binds tightly to most make coat resins, particularly those that include a hydrophobic silane component apart from that of the film of the abrasive grain. As a result, the film of the abrasive grain does not separate easily from either the particle or from the make coat upon exposure to water, thereby significantly reducing penetration of the abrasive product by water coolants employed during grinding or cutting. Material Removal Rate (MRR) and Cumulative Material Retention (CMR) are significantly increased as a result. "Surface finish," or "Ra," of a work piece also is significantly improved relative to that produced by use of abrasive products which do not employ a silane treatment or film of the invention. Further, the usable life of abrasive products of the invention can be significantly extended beyond that which would be expected of abrasive products that do not employ the surface-modified abrasive grains of the invention.

BRIEF DESCRIPTION OF THE DRAWINGS

FIG. 3A is a table of comparative test results obtained at 30 lbs on a Loesser centerless grinder employing an embodiment of the invention.

FIG. 4A is a table of comparative test results obtained at 50 lbs as a Loesser centerless grinder employing an embodiment of the invention.

DETAILED DESCRIPTION OF THE INVENTION

Figure 1:
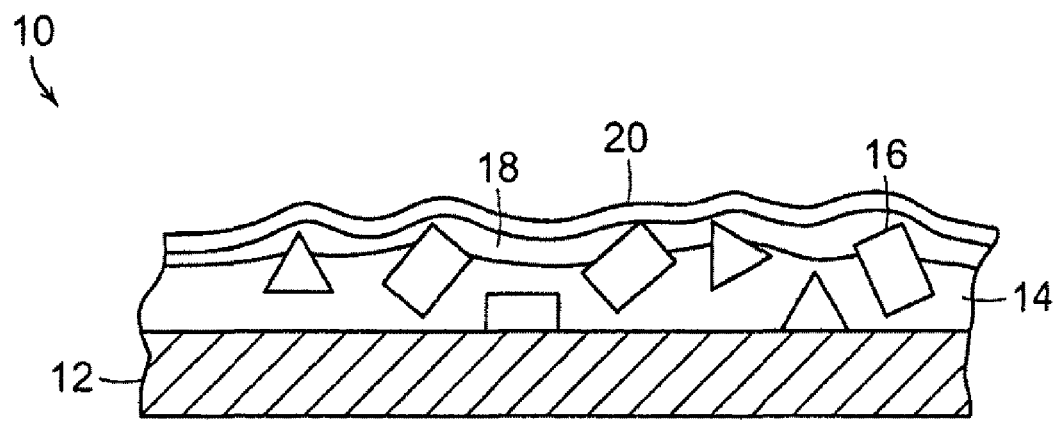
FIG. 1 is a cross section of a coated abrasive product of the invention employing the surface-modified abrasive particles of FIG. 1.

The foregoing will be apparent from the following more particular description of exampled embodiments of the invention, as illustrated by the accompanied drawings in which like reference characters refer to the same parts throughout the different views. The drawings are not necessarily to scale, with emphasis instead being placed on illustrated embodiments of the present invention.

The invention generally is directed to surface-modified abrasive grains, and to coated abrasive products and bonded abrasive products employing the surface-modified abrasive grains. The surface-modified abrasive grains of the invention include an abrasive grain substrate and a film on the abrasive grain that includes a relatively hydrophilic silane component and a relatively hydrophobic silane component. The invention is also directed to methods of making the surface-modified abrasive grains of the invention, as well as to coated and bonded abrasive products employing the surface-modified abrasive grains, and to methods of making and using coated and bonded abrasive products of the invention.

The term "relatively hydrophilic silane component," as that term is defined herein, means a silane monomer, oligomer or polymer, or to a monomeric repeating unit of an oligomer or polymer that exhibits more affinity for water than does another monomer, oligomer or polymer, or repeating monomeric silane component with which the relatively hydrophilic silane component has been combined. Examples of relatively hydrophilic silane components include amino silanes, amino silanes, ureido silanes, isocyanate silanes, oximino silanes and chloro silanes. Specific examples of particularly suitable relatively hydrophilic silane components include 3-aminopropyltriethoxy silane, 3-Aminopropyltriethoxysilane, Bis [(3-Triethoxysilyl)Propyl]Amine, 3-Aminopropyltrimethoxysilane, 3-Aminopropylmethyldiethoxysilane, 3-Aminopropylmethyldimethoxysilane, Aminoethylaminopropyltrimethoxysilane, Aminoethylaminopropyltriethoxysilane, Aminoethylaminopropylmethyldimethoxysilane, Aminoethylaminopropylmethyldiethoxysilane, Aminoethylaminomethyltriethoxysilane, Aminoethylaminomethylmethyldiethoxysilane, Diethylenetriaminopropyltrimethoxysilane, Diethylenetriaminopropyltriethoxysialne, Diethylenetriaminopropylmethyldimethoxysilane, Diethylenetriaminopropylmethyldiethoxysilane, Diethylenetriaminomethylmethyldiethoxysilane, Diethylaminomethyltriethoxysilane, Diethylaminomethylmethyldiethoxysilane, Diethylaminomethyltrimethoxysilane, Diethylaminopropyltrimethoxysilane, Diethylaminopropylmethyldimethoxysilane, Diethylaminopropylmethyldiethoxysilane, N—(N-Butyl)-3-Aminopropyltrimethoxysilane, (N-Phenylamino)Methyltrimethoxysilane, (N-Phenylamino)Methyltriethoxysilane, (N-Phenylamino)Methylmethyldimethoxysilane, (N-Phenylamino)Methylmethyldiethoxysilane, 3-(N-Phenylamino)Propyltrimethoxysilane, 3-(N-Phenylamino)Propyltriethoxysilane, 3-(N-Phenylamino)Propylmethyldimethoxysilane, 3-(N-Phenylamino)Propylmethyldiethoxysilane, piperazinylpropylmethyldimethoxysilane, piperazinylpropylmethyldiethoxysilane, piperazinylmethylmethyldiethoxysilane, Morpholinylpropyltrimethoxysilane, Morpholinylpropyltriethoxysilane, Morpholinylpropylmethyldimethoxysilane, Morpholinylpropylmethyldiethoxysilane, Morpholinylmethyltrimethoxysilane, Morpholinylmethylmethyldiethoxysilane, Aminohexylaminomethyltrimethoxysilane, Hexanediaminomethyltriethoxysilane, Aminohexylaminomethyltrimethoxysilane, Octanoylaminopropyltriethoxysilane, Cyclohexylaminopropyltrimethoxysilane, Cyclohexylaminopropyltriethoxysilane, Cyclohexylaminopropylmethyldimethoxysilane, Cyclohexylaminopropylmethyldiethoxysilane, 3-ureidopropyltrimethoxysilane, 3-ureidopropyltriethoxysilane, 3-isocyanatepropyltrimethoxysilane, 3-isocyanatepropyltriethoxysilane, Trimethoxysilane, Triethoxysilane, Methyldimethoxysilane, Methyldiethoxysilane, Methyltrimethoxysilane, Methyltriethoxysilane, Methyltripropoxysilane, Methyltributoxysilane, Methyltris(Tert-Butylperoxy)Silane, Dimethylethoxysilane, Dimethyldimethoxysilane, Dimethyldiethoxysilane, Propyltrimethoxysilane, N-Butyltrimethoxysilane, N-Butyltriethoxysilane, 1-Butyltrimethoxysilane, 1-Butyltriethoxysilane, Allyltriethoxysilane, Dodecyltrimethoxysilane, Dodecylmethyldimethoxysilane, Octodecyltrimethoxysilane, Octodecyltriethoxysilane, Octodecylmethyldimethoxysilane, N-Octyltrimethoxysilane, N-Octyltriethoxysilane, Octylmethyldiethoxysilane, Cyclohexyltriethoxysilane, Tetraacetoxysilane, Ethyltriacetoxysilane, Methyltriacetoxysilane, Dimethyldiacetoxysilane, Di-Tertbutoxy-Diacetoxysilane, Phenyltris(Methylethylketoxime)Silane, Tetra(Methylisobutylketoxime)Silane, Trimethyl(Methylethylketoxime)Silane, Dimethyldi(Methylethylketoxime)Silane, Methyltris(Methylisobutylketoxime)Silane, Methyltris(Acetoxime)Silane, Methyltris(Methylethylketoxime)Silane, Vinyltris(Methylisobutylketoxime)Silane, Methylvinyldi (Cyclohexanoneoxime)Silane, Methylvinyldi(Methylethylketoxime)Silane, Vinyltris(Methylethylketoxime)Silane.

As defined herein, the term "relatively hydrophobic silane component," means monomer, oligomeric and polymeric compounds that include moieties that cause the monomer, oligomer or polymer to have an affinity for water that is less than that of another silane component with which it is combined. Examples of classes of relatively hydrophobic silane components include vinyl silanes, methacrylate silanes, sulfur silanes, mercapto silanes, epoxy silanes, phenyl silanes. Examples of particular relatively hydrophobic silane components include γ-methacryloxypropyltrimethoxy silane, Vinyltrimethoxysilane, Vinyltriethoxysilane, Vinyltris(2-Methoxyethoxy)Silane, Vinyltrisisopropoxysilane, Vinyltris(Tert-Butylperoxy)Silane, Vinyldimethylethoxysilane, Vinylmethyldimethoxysilane, Vinylmethyldiethoxysilane, Allyltriethoxysilane, Vinyltriacetoxysilane, Vinyltrichlorosilane, Vinyldimethylchlorosilane, Vinylmethyldichlorosilane, Vinyltris(Methylisobutylketoxime)Silane, Methylvinyldi(Cyclohexanoneoxime)Silane, Methylvinyldi(Methylethylketoxime)Silane, Vinyltris(Methylethylketoxime)Silane, 3-Methacryloxypropyltrimethoxysilane, Methacryloxypropyltris(Trimethylsiloxy)Silane, 3-Methacryloxypropyltriethoxysilane, 3-Methacryloxypropylmethyldimethoxysilane, 3-Methacryloxypropylmethyldiethoxysilane, Methacryloxymethyltriethoxysilane, 3-Mercaptopropyltrimethoxysilane, 3-Mercaptopropyltriethoxysilane, 3-Mercaptopropylmethyldimethoxysilane, Bis(Triethoxysilylpropyl)Tetrasulfide, Bis(Triethoxysilylpropyl)Disulfide, Bis(Triethoxysilylpropyl)Polysulfide, Thiocyanto silane: 3-Thiocyanatopropyltriethoxysilane, 3-Glycidoxypropyltrimethoxysilane, 3-Glycidoxypropyltriethoxysilane, 3-Glycidoxypropylmethyldiethoxysilane, 3-Glycidoxypropylmethyldimethoxysilane, Vinyltriacetoxysilane.

The definitions of "relatively hydrophilic silane component" and "relatively hydrophobic silane component" mean that inclusion in a single layer, or within distinct layers of an abrasive particle, of two silane components that differ in affinity for water, will constitute the presence of a "relatively hydrophilic silane component" and a "relatively hydrophobic silane component." Further, preferably, at least one of the silanes can chemically react with a component of a binder resin employed to form a coated abrasive product or bonded abrasive tool of the invention. In a more preferred embodiment, at least one of the silanes forms a covalent bond with a component of the binder resin. Suitable resins are such as are known in the art.

Typically, the weight ratio of film that includes relatively hydrophilic and relatively hydrophobic silane components over an abrasive grain is in the range of between about 1:99 and about 99:1 of relatively hydrophilic silane component to relatively hydrophobic silane component. In a preferred embodiment, the ratio is in a range of between about 1:49 and about 49:1. In a particularly preferred embodiment, the ratio is in a range of between about 1:9 and about 9:1.

The weight ratio of film to abrasive particle in a coated abrasive particle of the invention typically is in a range between about 1:8000 and about 1:400. In a preferred embodiment the weight ratio is between about 1:6000 and about 1:300. In an even more preferred embodiment, the weight ratio is in a range of between about 1:4000 and about 1:200.

The thickness of a coating that includes relatively hydrophilic an relatively hydrophobic silane components over an abrasive particle can be, for example, in a range of between about 1 angstrum (Å) and 5 microns. In a preferred embodiment the thickness of the coating is between about 10 Å and about 2 microns. In another embodiment, the thickness of the coating is a range of between about 15 Å and about 1 micron.

Generally, any abrasive particle that is suitable as an abrasive in industrial or commercial applications is suitable for use in the invention. A suitable material for abrasive particles useful in the invention can be of any conventional abrasive particle material utilized in the formation of coated abrasive tools. Examples of suitable abrasive particle materials for use in the invention include diamond, corundum, emery, garnet, chert, quartz, sandstone, chalcedony, flint, quartzite, silica, feldspar, pumice and talc, boron carbide, cubic boron nitride, fused alumina, ceramic aluminum oxide, heat treated aluminum oxide, alumina zirconia, glass, silicon carbide, iron oxides, tantalum carbide, cerium oxide, tin oxide, titanium carbide, synthetic diamond, manganese dioxide, zirconium oxide, and silicon nitride.

Other suitable grains include agglomerates such as are described in U.S. Pat. No. 6,797,023, the teachings of which are incorporated herein by reference in their entirety. A coated abrasive product of the invention can include particulate material containing green, unfired abrasive comprising abrasive grit particles and nanoparticle binder, as described in U.S. application Ser. No. 12/018,589, filed Jan. 23, 2008, the teachings of which are incorporated herewith in their entirety.

The abrasive materials can be oriented or can be applied to the substrate without orientation (i.e., randomly), depending upon the particular desired properties of the coated abrasive tools. In choosing an appropriate abrasive material, characteristics, such as size, hardness, compatibility with workpieces and heat conductivity, are generally considered. Abrasive particle materials useful in the invention typically have a particle size ranging from about 10 nanometers (nm) to about 6 millimeters (mm), such as from about 100 nm to about 3 mm, or from about 1 micron (μ) to about 600μ.

The film of surface-modified abrasive particles of the invention can include a single or a plurality of layers. In one embodiment, the film is a single layer that includes a relatively hydrophilic silane component and a relatively hydrophobic silane component. Each of the relatively hydrophilic and relatively hydrophobic silane components can independently be included in the coating as an independent monomer unit, an oligomer or a polymer. Further, the relatively hydrophilic and relatively hydrophobic silane components can be components of oligomers or polymers. The polymers can be co-polymers or block co-polymers, such as random block co-polymers, of at least one of the hydrophilic and relatively hydrophobic silane components. Similarly, oligomers can include at least one of the relatively hydrophilic and relatively hydrophobic silane components.

In another embodiment, the film of the surface-modified abrasive grain of the invention includes a first film layer proximate to the abrasive particle that includes only, or predominately, a relatively hydrophilic silane component, as opposed to relatively hydrophobic silane component. A second, or distal film layer of the film predominately includes a relatively hydrophobic silane component as opposed to the relatively hydrophilic silane component. It is believed that surface-modification of an abrasive particle with a relatively hydrophilic silane component significantly increases wettability of the particle and provides a better seal against water when an abrasive product that employs the surface-modified abrasive grain is in use. It is further believed that, typically, the relatively hydrophilic silane component will form a relatively high proportion of covalent bonds with the abrasive grain substrate. It is also believed that the relatively hydrophobic silane component will bind tightly both with the relatively hydrophilic silane component and with materials generally employed as make coats of coated abrasive products and with bond materials of bonded abrasive products.

In one embodiment, a method of forming a surface-modified abrasive grain of the invention includes combining relatively hydrophobic and relatively hydrophilic silane components to form a mixture. The mixture is combined with a solvent to form a silane solution. Examples of suitable solvents include isopropyl alcohol, ethanol, methanol, toluene, acetone, water and mixtures thereof. The amount of solvent employed is at least sufficient to dissolve the silane components. In one embodiment, the pH of the solution can be adjusted to a suitable pH, such as a pH in a range of between about 3 and about 7, or, more preferably, between about 4 and about 6. An example of a suitable method by which the pH can be adjusted is addition of acetic acid. Other methods of adjusting the pH include, for example, use of maelic acid, stearic acid, maelic anhydride, weak solutions of HCl, $HNO_3$, $H_2SO_4$, ammonium chloride, ammonium hydroxide, sodium hydroxide solution, potassium hydroxide solution. The solution is reacted to form an at least partially oligomerized silane solution. Further, depending upon the silane component employed, the solution can be at least partially hydrolyzed to form a hydrolyzed solution. The at least partially oligomerized silane solution, is then blended with an abrasive grain component to form the surface-modified abrasive grain. In one embodiment, the surface-modified abrasive grain is exposed to ambient, or, alternatively, some elevated temperature, or other suitable conditions, to thereby cure the film. Preferably, the surface-modified grain is cured at a temperature in a range of between about 10° C. and about 300° C. Also, preferably, the period of time of the curing is in a range of between about 15 minutes and about 24 hours. In one embodiment the surface-modified grain is cured at a temperate of about 10° C. for about 24 hours. In another embodiment, the surface-modified grain is cured at a temperature of about 80° C. for about 3 hours, and in still another embodiment, the surface-modified grain is cured at a temperature of about 100° C. for about 1.5 hours. In another embodiment, the surface-modified grain is cured at a temperature of about 200° C. for about 30 minutes, or at about 300° C. for about 15 minutes.

In a preferred embodiment, the relatively hydrophilic silane component is 3-aminopropyltriethoxy silane, the relatively hydrophobic silane component is γ-methacryloxypropyltrimethoxy silane and a weight ratio of the two is about 1:1. In this preferred embodiment, the abrasive grain is a seeded-gel ceramic grain or powder, having a mean particle diameter of about 100 microns. The weight ratio of silane component to weight of abrasive particles is about 1:1000. The solvent is isopropyl alcohol and the pH is adjusted to a range of about 3-7 with glacial acetic acid. The surface-modified abrasive particles of this embodiment are cured at a temperature of a about 80° C. for a period of time of about 3 hours.

In another embodiment, the invention is a coated abrasive product. An example of a coated abrasive product of the invention is shown in FIG. 1. As shown therein, coated abrasive product 10 includes backing layer 12. Examples of suitable backing layers include polyester, cotton, polycotton, rayon, and paper/with or without saturation/with or without backfill/frontfill/non-woven products/backingless abrasives as is known in the art. Make coat 14 on backing layer 12 is formed of a suitable material, such as acrylic, phenolic, etc., as is known in the art. Surface-modified abrasive grains 16 of the invention are embedded in make coat 14. Coated abrasive product 10 can, optionally, include a suitable size coat 18 and supersize coat 20, as is known in the art.

Coated and bonded abrasive products of the invention can optionally further include one or more additives, such as fillers, coupling agents, fibers, lubricants, surfactants, pigments, dyes, wetting agents, grinding aids, anti-loading agents, anti-static agents and suspending agents. In one embodiment, a filler component that can be employed in the invention includes a cryolite and at least one member selected from the group consisting of a hexafluorophosphate, a hexafluoroferrate, a hexafluorozirconate and ammonium tetrafluoroborate (($NH_4$)$BF_4$). Examples of hexafluorophosphates (salts of $PF_6^-$) include ammonium salt (($NH_4$)$PF_6$), alkali metal salts (e.g., $LiPF_6$, $NaPF_6$, $KPF_6$, $CsPF_6$, etc.) and alkaline earth metal salts (e.g., $Mg(PF_6)_2$, $Ca(PF_6)_2$, $Sr(PF_6)_2$, $Ba(PF_6)_2$, etc.), and mixed salts thereof (e.g., ammonium and sodium salts, such as ($NH_4$)$Na(PF_6)_2$, ammonium and potassium salts, such as ($NH_4$)$K(PF_6)_2$, sodium and potassium salts, such as $NaK(PF_6)_2$, etc.). Specific examples of hexafluorophosphates include sodium hexafluorophosphate ($NaPF_6$) and potassium hexafluorophosphate ($KPF_6$), and combinations thereof. Examples of hexafluoroferrates (salts of $FeF_6^{3-}$) include ammonium salt (($NH_4$)$_3FeF_6$), alkali metal salts (e.g., $Li_3FeF_6$, $Na_3FeF_6$, $K_3FeF_6$, $Cs_3FeF_6$, etc.) and alkaline earth metal salts (e.g., $Mg_3(FeF_6)_2$, $Ca_3(FeF_6)_2$, $Sr_3(FeF_6)_2$, $Ba_3(FeF_6)_2$, etc.), and mixed salts thereof (e.g., ammonium and sodium salts, such as ($NH_4$)$Na_2FeF_6$ and ($NH_4$)$_2NaFeF_6$, ammonium and potassium salts, such as ($NH_4$)$_2KFeF_6$ and ($NH_4$)$_2KFeF_6$, sodium and potassium salts, such as $K_2NaFeF_6$ and $KNa_2FeF_6$, calcium and sodium salts, such as $CaNaFeF_6$, calcium and potassium salts, such as $CaKFeF_6$, etc.). Specific examples of hexafluoroferrates include ammonium hexafluoroferrate (($NH_4$)$_3FeF_6$) and alkali metal hexafluoroferrates, such as sodium hexafluoroferrate ($Na_3FeF_6$) and potassium hexafluoroferrate ($K_3FeF_6$), and combinations thereof. Examples of hexafluorozirconates (salts of $ZrF_6^{2-}$) include ammonium salt (($NH_4$)$_2ZrF_6$), alkali metal salts (e.g., $Li_2ZrF_6$, $Na_2ZrF_6$, $K_2ZrF_6$, $Cs_2ZrF_6$, etc.) and alkaline earth metal salts (e.g., $MgZrF_6$, $CaZrF_6$, $SrZrF_6$, $BaZrF_6$, etc.), and mixed salts thereof (e.g., ammonium and sodium salts, such as ($NH_4$)$NaZrF_6$, ammonium and potassium salts, such as ($NH_4$)$KZrF_6$, sodium and potassium salts, such as $NaKZrF_6$, etc.). Specific examples of hexafluorozirconates include ammonium hexafluorozirconate (($NH_4$)$_2ZrF_6$) and alkali metal hexafluorozirconates, such as sodium hexafluorozirconate ($Na_2ZrF_6$) and potassium hexafluorozirconate ($K_2ZrF_6$), and combinations thereof. In a specific embodiment, at least one of the hexafluorophosphate, the hexafluoroferrate and the hexafluorozirconate is an ammonium salt or a sodium salt. In yet another specific embodiment, the hexafluorophosphate is ammonium hexafluorophosphate, the hexafluoroferrate is sodium hexafluoroferrate, and the hexafluorozirconate is sodium hexafluorozirconate. In yet another specific embodiment, the filler component includes at least one member selected from the group consisting of ammonium hexafluorophosphate, sodium hexafluoroferrate, sodium hexafluorozirconate and ammonium tetrafluoroborate. In yet another specific embodiment, the filler component includes at least one member selected from the group consisting of ammonium hexafluorophosphate, sodium hexafluoroferrate and sodium hexafluorozirconate. In yet another specific embodiment, the filler component includes at least one member selected from the group consisting of sodium hexafluorozirconate and sodium hexafluoroferrate.

As used herein, a "cryolite" means a salt of aluminum hexafluoride ($AlF_6^{3-}$), such as an alkali metal salt, an alkaline earth metal salt, or an ammonium salt, or a combination thereof. Examples of cryolites include lithium aluminum hexafluoride ($Li_3AlF_6$), sodium aluminum hexafluoride ($Na_3AlF_6$), potassium aluminum hexafluoride ($K_3AlF_6$), ammonium aluminum hexafluoride (($NH_4)_3AlF_6$), sodium ammonium hexafluoride (e.g., $K(NH_4)_2AlF_6$ or $K_2(NH_4)AlF_6$), potassium ammonium aluminum hexafluoride (e.g., $Na(NH_4)_2AlF_6$ or $Na_2(NH_4)AlF_6$), sodium potassium ammonium hexafluoride (i.e., $NaK(NH_4)AlF_6$), lithium ammonium aluminum hexafluoride (e.g. $Li(NH_4)_2AlF_6$ or $Li_2(NH_4)AlF_6$), etc. In one specific embodiment, sodium aluminum hexafluoride ($Na_3AlF_6$) is employed as a cryolite. The cryolite generally is present in an amount in a range of between about 2 wt % and about 98 wt %, such as between about 2 wt % and about 65 wt %, between about 2 wt % and about 50 wt %, of the filler component. In a specific embodiment, the amount of the cryolite is in a range between about 2 wt % and about 30 wt %, or between about 2 wt % and about 20 wt % of the filler component.

In another embodiment, the filler component that can be employed in the invention includes at least one member selected from the group consisting of a hexafluoroferrate, a hexafluorophosphate and a hexafluorozirconate. Suitable examples, including particular examples, of the hexafluoroferrate, the hexafluorophosphate and the hexafluorozirconate are as described above. In one specific embodiment, at least one of the hexafluoroferrate and the hexafluorozirconate is an ammonium salt or a sodium salt. In another specific embodiment, the filler component includes at least one member selected from the group consisting of a hexafluoroferrate and a hexafluorozirconate. In another specific embodiment, the filler component includes at least one member selected from the group consisting of sodium hexafluoroferrate and sodium hexafluorozirconate. Any suitable amount of the hexafluoroferrate, the hexafluorophosphate and the hexafluorozirconate can be employed in the invention.

In a specific embodiment, the hexafluoroferrate, the hexafluorophosphate and the hexafluorozirconate, disclosed herein, is each independently present in a range of between about 2 wt % and about 100 wt % of the filler component, such as between about 2 wt % and about 98 wt %, between about 35 wt % and about 98 wt % or between about 50 wt % and about 98 wt %, of the filler component. Alternatively, in an embodiment further employing a cryolite, the hexafluoroferrate, the hexafluorophosphate and the hexafluorozirconate is each independently present in a range of between about 2 wt % and about 98 wt % of the filler component, such as between about 35 wt % and about 98 wt % or between about 50 wt % and about 98 wt %, of the filler component.

In another specific embodiment, the filler component of the invention is present in an amount in a range between about 0.5 wt % and about 50 wt %, between about 10 wt % and about 50 wt %, between about 0.5 wt % and about 20 wt %, or between about 10 wt % and about 20 wt %, of the weight of the abrasive component.

In some embodiments, the filler component is incorporated into a bond component for abrasive products, such as coated abrasive products and bonded abrasive products. The bond component also includes a binder. Any suitable bond material known in the art can be used for the binder. The binder can be an inorganic binder or an organic binder. Suitable examples of organic binders include hide glue, urethane resins, acrylate resins, polyvinyl alcohols, epoxy resins, phenolic resins, urea-formaldehyde phenolic resins, aminoplast resins and melamine-formaldehyde resins, and combinations thereof. Suitable examples of inorganic binders include cement, calcium oxide, clay, silica, magnesium oxide, and combinations thereof. Specific examples of suitable inorganic binders can be found in U.S. Pat. Nos. 4,543,107; 4,898,597; 5,203,886; 5,025,723; 5,401,284; 5,095,665; 5,536,283; 5,711,774; 5,863,308; and 5,094,672, the entire teachings of all of which are incorporated herein by reference. Specific binder(s) included in the bond component can be chosen depending upon particular application(s) of the bond component, for example, types of abrasive products and/or coats employing the bond component.

A suitable method of fabricating a coated abrasive product of the invention includes combining surface-modified abrasive grains of the invention with a resin that will become the make coat. The combined surface-modified abrasive grains and resin are applied to the backing, and the resin is then cured by a suitable method, such as by radiation, thermal, microwave, RF polymerization, individually or in any combination, as is known in the art.

Figure 2:
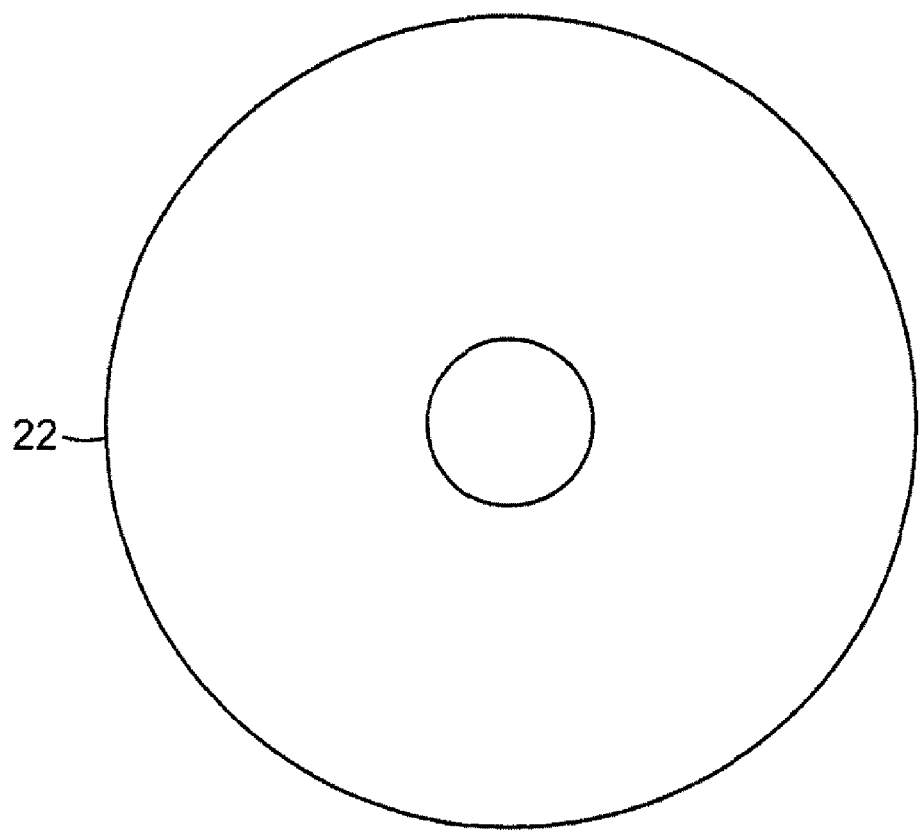
FIG. 2 is an example of a bonded abrasive tool of the invention employing the abrasive particles of FIG. 1.
Figure 3B:
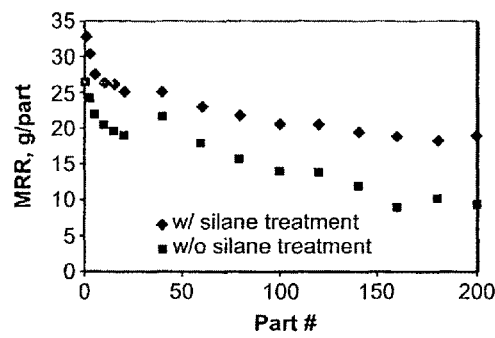
FIG. 3B is a plot of MRR presented in the table of FIG. 3A.
Figure 3C:
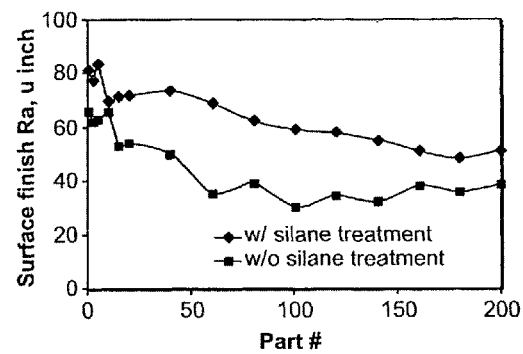
FIG. 3C is a plot of surface finish, Ra, presented in the table of FIG. 3A.
Figure 3D:
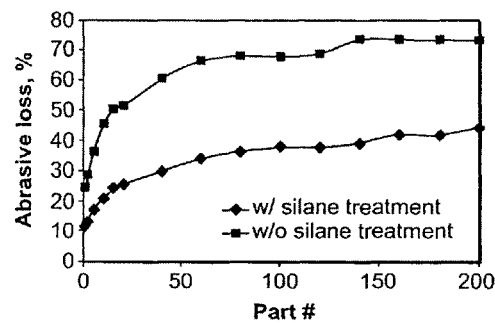
FIG. 3D is a plot of abrasive loss (%) presented in the table of FIG. 3A.
Figure 4B:
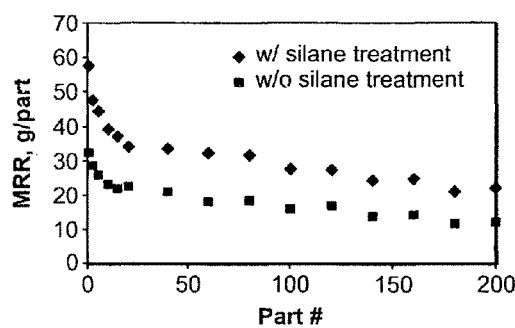
FIG. 4B is a plot of MRR presented in the table of FIG. 4A.
Figure 4C:
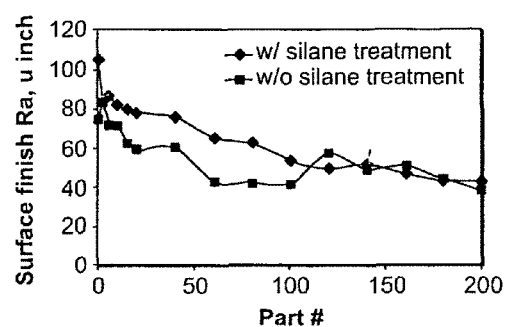
FIG. 4C is a plot of surface finish, Ra, presented in the table of FIG. 4A.
Figure 4D:
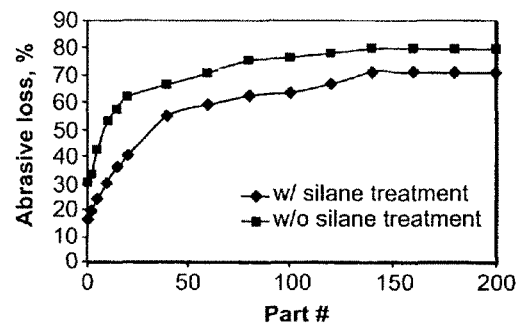
FIG. 4D is a plot of abrasive loss (%) presented in the table of FIG. 4A.

In another embodiment, the invention is bonded abrasive product, such as bonded wheel 22, shown in FIG. 2. Wheel 22 includes a bond component and an abrasive grain component of the invention that includes an abrasive grain, and a film over the abrasive grain, wherein the coating includes a relatively hydrophobic silane component and a relatively hydrophilic silane component. A method of fabricating a bonded abrasive product of the invention includes a resin or a vitreous glass bond along with a binder. The green compound is molded or formed into the desired shape and subsequently thermally cured or fired to result in the final product.

In still another embodiment, the invention includes a method of grinding or cutting the work piece. The method includes the step of applying to the work piece an abrasive product of the invention that includes a polymerized combination of relatively hydrophilic and hydrophobic silane components. The abrasive product employed in the method can, for example, be either a coated abrasive product or a bonded abrasive product.

The following examples are representative only, and not intended to be limiting.

EXEMPLIFICATION

Example 1

The following components were used for the preparation of the silane treated grain:
Grain used was seeded sol-gel alumina grain
A-174 silane→γ-methacryloxypropyltrimethoxy silane
A-1100 silane→3-aminopropyltriethoxy silane
DI water
Isopropyl alcohol
Procedure for Silane Treatment of Grain:
The silane treatment of the abrasive grain included three steps, namely (1) the preparation of the silane solution, (2) mixing of the prepared silane solution with the abrasive grain and blending the mix, and (3) curing the subsequent silane treated grain at elevated temperature.

Step 1. The recipe for preparing the silane solution was as follows:

The silane solution was prepared by starting out with measuring 5.68 grams of the γ-methacryloxypropyltrimethoxy silane and 5.68 grams of the 3-aminopropyltriethoxy silane. The two silanes were mixed using a magnetic stirrer. To this mixture 101.25 grams of isopropyl alcohol was added with continued agitation of the mix. Once the silane mixtures was dispersed in the isopropyl alcohol, 11.35 gram of DI water was added to the mix. Glacial acetic acid was added to the mix to attain a pH of 5-6 and the solution was left under agitation for 3-4 hours for hydrolysis of the silane.

Step 2. Treatment of the abrasive grain with the silane solution prepared in step 1:

For treating the abrasive grain with the silane solution prepared in Step 1, a V-blender with an intensifier bar was used. The V-blender was loaded with 9090.91 grams of seeded gel SG P150 grain to correspond with the amount of silane solution prepared in Step 1. The silane was pumped into the V-blender at around 5-7 milliliters per minute while the V-blender was on and turning. Once all the silane solution prepared in Step 1 had been pumped into the V-blender, the mixture was allowed to blend in the V-blender for another 15-20 minutes. The contents of the V-blender were then taken out of the V-blender and processed through Step 3.

Step 3. Curing the silane treated grain The V-blended seeded gel grain was subsequently cured in an oven at 80° C. for 3 hours to produce the final silane treated grain used for preparing the make resin slurry and in the electrostatic grain projection.

Example of Using Silane Treated Grain:
Formulation #1 Recipe:

| Component | Supplier | Wt. Percentage, % |
|---|---|---|
| Bisphenol-A epoxy diacrylate with 40% TMPTA (Trimethylolpropane triacrylate) | Cytec | 38.73% |
| Acidic acrylate oligomer (CN-147 from Cytec) | Sartomer, Cytec | 2.17% |
| Defoamer BYK A501 (polysiloxane-based) | BYK | 0.1% |
| 2-Hydroxy-2-methyl-1-phenyl-propanone | Cytec, Lamberti, Ciba | 1% |
| Bis (2,4,6-trimethylbenzoyl)phenyl-phosphine oxide | Ciba | 1% |
| Calcium silicate | NYCO | 35% |
| Seeded-Gel Grain P150 grit (treated or untreated) | Saint-Gobain | 22% |

The mixing instructions were as follows:
1. Add bisphenol-A epoxy diacrylate with 40% TMPTA mixture to mix vessel.
2. Add acidic acrylate oligomer under agitation.
3. Add defoamer BYK A501 under agitation.
4. Add 2-hydroxy-2-methyl-1-phenyl-propanone under agitation.
5. Add bis(2,4,6-trimethylbenzoyl)phenylphosphine oxide. Mix is fully dissolved.
6. Add wollastonite. Mix 5 minutes.
7. Add grain. Mix for 30 minutes.

Belt Preparation:
Engineered abrasive belts were prepared by employing the following steps:
Coating the slurry mix prepared as above on Y-weight polyester backing
Electro-statically coated with grains
Embossing the pattern
UV-curing and rewind
Postcure at 275° F. for 18 hour
Flex the web and make a 6"×98" belt for testing The Test protocol was as follows:
Test machine: Loeser RSP374 centerless
Contact Wheel: 65 Shore A 1:3 serrated
Regulating wheel: 55 Shore A
Belt speed: 7400 SFPM
Contact Wheel speed: 1766 RPM
Regulating Wheel speed: 112 RPM
Belt Tension: 40 lbs
Regulating wheel tilt degree: 5
Reg. Wheel Swing Deg.: 2
Contact wheel pressure: 85 PSI
Regulating wheel pressure: 65 PSI
Applied forces: 30 or 50 lbs
Coolant: 2% Trimclear in DI water
Work piece material: 1045 CS; hardness 13.49 Rc
Work piece dimension: Φ1.5"×20" long The Test Procedure was as Follows:

Work pieces were passed through the centerless machine at setting force. The weight and surface finish of the parts and the thickness of the belt at three designated location were taken at part 1, 2, 5, 10, 15, 20, and then every 20 parts.

Results and Conclusions

Figures 5A, 5B:
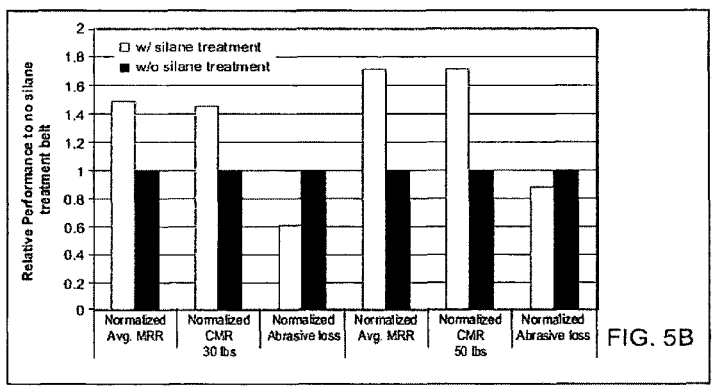
FIG. 5A is a table summarizing the results presented in the tables of FIGS. 3A-4A.
FIG. 5B is a histogram of the results presented in FIG. 5A.
Figure 6:
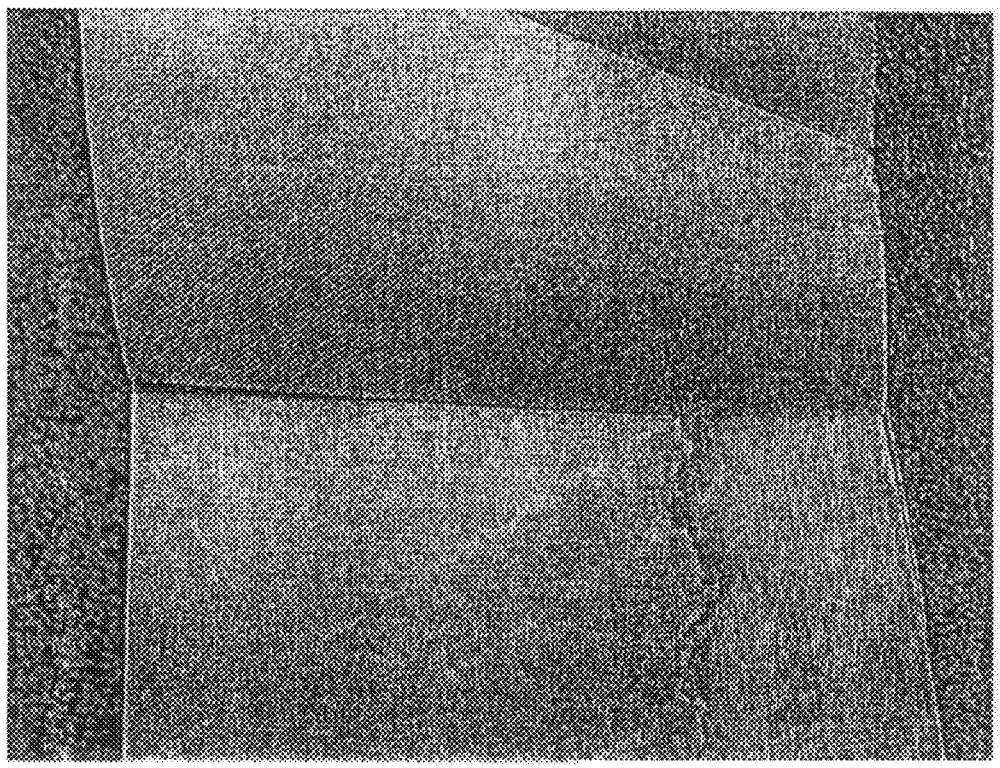
FIG. 6 is a photograph of the embodiment of the invention and that of the comparative product employed in generating the test results of the tables presented in FIGS. 3A-3D, 4A-4D and 5A-5B.

Two batches of belts were prepared using the formulation shown above. The control used grains without any treatment. Another batch used aforementioned surface-modified grains. The belts were tested on a Loesser centerless grinder with 30 lbs (FIGS. 3A-3D) or 50 lbs (FIGS. 4A-4D) applied force. In general, silane treatment improved grinding performance and the life of the belts at both low and high force loads. As shown in FIGS. 5A and 5B, belts made with silane treated grains showed 49% higher average MRR from part 10 to 100 and 39% less abrasive loss after grinding 100 parts than non-treated versions at 30 lbs load, and at a higher load of 50 lbs, a similar trend followed. As can be seen in FIG. 6. The impact on belt life can also be observed from belt appearance after 100 parts as shown in the photograph: severe abrasive coating loss was presented on the control belt (bottom) compared to belts with surface-modified grain (top).

Example 2

Methodology of Sample Preparation for Samples of Another Embodiment of the Invention 1. Surface Treatment for Abrasive Grain
   1.1. Materials used:
   FRPL grain P800 grit size→obtained from Treibacher
   BFRPL grain P800 grit size→obtained from Treibacher
   A-174 silane→γ-methacryloxypropyltrimethoxy silane
   A-1100 silane→3-aminopropyltriethoxy silane
   A-1289 silane→Bis-[triethoxysilylpropyl] tetrasulfide
   Isopropyl alcohol
   Deionized water All silanes procured from OSi Specialites Inc. Currently they can be procured from Momentive Performance Materials
   1.2. Steps of Silane Treatment of Abrasive Grain:
   1.2.1. Step 1: the first step of the surface treatment of the grain involves preparation of the silane solution to be used for the treatment. Three silane treatments were used to treat both the BFRPL and FRPL P800 grit used in this experiment. The silane treatments differed in the type of silane chosen for the treatment and were namely, (1) A-174 silane alone, (2) combination of A-174 and A-1100 silane, and (3) A-1289 bis-sulfur silane. The amount of silane: water: isopropyl alcohol for each of the above 3 treatments to process a batch of 8 kg abrasive grain is shown in Table 1.

TABLE 1

Description of ratios for the 3 types of silane treatment used to treat 8 kgs of BFRPL and FRPL P800 alumina abrasive grain

| Treatment Type | Amount of A-174 silane (g) | Amount of A-1100 silane (g) | Amount of A-1289 Silane (g) | Isopropyl alcohol (g) | DI water (g) |
|---|---|---|---|---|---|
| A-174 silane alone | 5.0 | — | — | 90 | 5 |
| A-174 And A-1100 silane combination | 4.5 | 0.5 | — | 90 | 5 |
| A-1289 silane alone | — | — | 5 | 90 | 5 |

To prepare the silane solution for the pretreatment the requisite amount of silane was added to the beaker. If two silanes were to be used, as in the combination of A-174 and A-1100 silane both the silanes were added in the requisite amount and mixed in a beaker using a shear mixer. To this mixture the specified amount of isopropyl alcohol was added while continuing the agitation. At this point the pH was adjusted to 5 using glacial acetic acid. Further, the specified amount of water was added with continued stirring and the solution was left to stand for 3.5 hours for hydrolysis.

1.2.2. Step 2: The untreated abrasive grain (8 kg) was put in the V-blender with an intensifier bar and the silane solution prepared in step 2 above was pumped into the V-blender while rotating and mixing over a period of 15 minutes. The V-blender was left to continue to rotate over a period of another 1 hour to ensure complete mixing of the silane solution with the abrasive grain. Thereafter the V-blender was stopped and emptied out resulting in the silane treated grain.

1.2.3. Step 3: The step 4 of treatment of the grain comprised of leaving the silane treated grain obtained from step 3 in a fume hood overnight for the isopropyl alcohol to be driven out and then heating the grain at 200° F. for 3 hours.

1.2.4. Step 4: The last step of the surface treatment of the grain is flow treatment of the grain using 0.05 wt % of Cabosil untreated amorphous silica of commercial grade Cabosil M5 obtained from Cabot Corporation. This is achieved by mixing the amount of grain and Cabosil in a V-blender with an intensifier bar and blending the mixture for approximately an hour to ensure uniform distribution of the flow treatment. The flow treatment was done to all the samples including the non-silane treated grain and the silane-treated grain (described below) to ensure ease in projection during the subsequent electrostatic projection, a step in processing to make an abrasive disc.

1.2.5. The above treatment procedure resulted in 6 types of abrasive grains, namely (1) A-174 silane treated BFRPL grain, (2) A-174 silane treated FRPL grain, (3) A-174 and A-1100 combination silane treated BFRPL grain, (4) A-174 and A-1100 combination silane treated FRPL grain, (5) bis-sulfur silane treated BFRPL grain and (6) bis-sulfur silane treated FRPL grain. Also, prepared were 2 more control abrasive grains namely (1) non-silane treated BFRPL grain and (2) non-silane treated FRPL grain. All the above 8 abrasive grains were flow treated according to Step 4

2. Steps for Making the Make Resin Mix
    2.1. Step 1: Bis-phenol-A-diacrylate was preheated at 125-135° F. for 24 hours. 1,6 Hexinedioal diacrylate, Trimethylolpropane triacrylate, BYK-501 defoamer, FC-171 and KR-55 were weighed out in their respective quantities in a drum and the preheated Bis-phenol-A-diacrylate was added to the mixed to this for 30-45 minutes using Meyers high speed disperser with 8: dia blade. The amount of each quantity used for the above components is specified in Table 2. The mixing was stopped and the walls and base of the drum was checked for undissolved resin. If there was inhomogenity in the mix the solution was continued to be mixed till a homogeneous solution was obtained. The viscosity range for the mix for a 80° F. solution was maintained between 400-500 cps. This mix was then stored in dark in ambient temperatures conditions preferably under 90° F.±2° F.

TABLE 2

Description of amounts in percents for the components of the base resin mix for the make resin

| Description | Product Name Manufacterer | Amount (%) |
|---|---|---|
| Bis-phenol-A-diacrylate | Ebecryl 3700, Cytec, Sartomer | 49.63 |
| 1,6 Hexinedioal | Cytec, Sartomer | 24.88 |
| Trimethylolpropane triacrylate | Cytec, Sartomer | 24.88 |
| Defoamer | BYK-501, BYK | 0.24 |
| Tetra (2,2 diallyloxymethyl)butyl, di(ditridecyl)phosphito titanate, | KR-55, Kenrich Petrochemicals | 0.17 |
| Fluorochemical Surfactant | Fluorad Bran FC171, 3M | 0.20 |

2.2. Step 2: The second step was to prepare the catalyst solution for the make resin mix. For this, the V-pyrol was weighed in the desired quantity specified in Table 3. To this mix Irgacure 651 was mixed under moderate agitation until dissolved (approximately 20 minutes). This mix was then stored in a cool dark place under 90° F.±2° F.

TABLE 3

Description of amounts in percents for the components of the catalyst mix for the make resin

| Description | Product Name Manufacterer | Amount (%) |
|---|---|---|
| N-Vinyl-2-pyrrolidone | BASF, Polysciences, ISP | 77.78 |
| 2,2-Dimethoxy-1,2-diphenylethan-1-one | Irgacure 651, Ciba Speciality Chemicals | 22.22 |

2.3. Step 3: The catalyst from Step 2 was measured out and to this the resin premix from Step 1 was added with the mix ratio being 7:33 by weight for the mix from Step 2: Step 1. This was mixed at high speed with disperser using a 4" shear blade or equal. Mixing was done at 1780 SFPM for approximately 15 minutes or until a homogeneous solution was obtained. The viscosity range of the resulting solution was noted between 150-200 cps using a Brookfield viscometer.

3. Steps for making the size resin mix
    3.1. Step 1: For the first step of preparing the size resin mix isopropyl alcohol was mixed with water using a small air mixer in a clean container. To this silane A-1100 was slowly added while mixing with continued agitation thereafter for another 20 minutes to prepare the silane A-1100 mix used in the next step. The ratios of the mix were as per Table 4.

TABLE 4

Percentage of components used for preparing silane A-1100 mix

| Description | Product name, Manufacturer | Amount (%) |
| --- | --- | --- |
| 3-aminorpopyltriethoxy silane | Silane A-1100, OSi Specialities Inc. | 50.63 |
| Isopropyl alcohol | — | 37.11 |
| Water | — | 12.26 |

3.2. Step 2: Tris (2-hydroxyethyl) isocyanurate acrylate, 2-Hydroxy-2-Methylpropiophenone, Fluorochemical Surfactant FC 171 and defoamer BYK-501 were mixed together in a drum, as specified in Table 5., for around 20-30 minutes at slow speed of 10000 SFPM. To this the silane A-1100 mix prepared in Step 1 above was slowly added and mixed for 10 minutes at a slow speed. It is essential that the silane A-1100 mix be added to the base resin mix under agitation to avoid formation of gelatin. This mix has a good shelf life of 2 weeks in a plastic container.

TABLE 5

Description of amounts in percents for the components of the base resin mix for the size resin

| Description | Product name, Manufacturer | Amount (%) |
| --- | --- | --- |
| Tris (2-hydroxyethyl) isocyanurate acrylate | SR-368, Sartomer | 94.06 |
| 2-Hydroxy-2-Methylpropiophenone | Daracure 1173, Ciba Speciality Chemicals, Lamberti, Ciba | 3.77 |
| Fluorochemical Surfactant | Fluorad Bran FC171, 3M | 0.09 |
| Defoamer | BYK-501, BYK | 0.23 |
| Silane A-1100 mix | — | 1.85 |

4. Preparation of the Abrasive Article 4.1. The preparation of the abrasive article from which abrasive discs were subsequently stamped out for performance evaluation testing started with the unwind station where a 3 mil PET roll was unwound. Onto this web the make resin prepared above was applied to obtain a make resin weight of around 0.52 lbs/ream. This was B-staged (partially cured) using UV lights (D and H bulbs). The partially cured make on the 3 mil PET backing was passed through an electrostatic grain projection unit to apply the abrasive grain silane and flow treated as described above. 8 different runs were carried out for each of the different 8 surface treated grains prepared above. Following the electrostatic projection of the abrasive grain to result in grain weights of around 1.7 lbs/ream a full cure of the maker resin was done using UV lights (D & H bulbs). To the cured make resin and abrasive grain surface another layer of the size resin was applied and cured fully using UV lights (D and H bulb) sequence. The cured product was wound up into a jumbo roll on the rewind station. These jumbos were subsequently converted into 6" abrasive discs and used for testing as described below.

5. Testing of the abrasive article 5.1. A DA sander was used to test the performance of the above 8 types of discs.

For the testing 6, 30 seconds grind cycles were used under dry grinding conditions. The substrate being ground was chosen as an acrylic panel using 6 panels such that each cycle would start afresh on a newly prepared sample. After each 30 seconds grind cycle the ground panel was weighed to measure the loss in weight and the material removal was recorded.

Results and Conclusions

Coated abrasive disks were made as described with variation in grain and grain treatment. Treated FRPL and BFRPL Grains, which included single silane A174, bis-sulfur silane, and combination of A 174 and A 1100, were all evaluated against the control made by raw FRPL and BFRPL. For both grain types, disks with combination silane (combination of relatively hydrophilic silane component and relatively hydrophobic silane component) treatment grains showed the highest cumulative material removed compared to control and single (single silane component) treated grain versions. Although CMR of one of the single-silane-treatment versions performed close to that of the combination treatment (of relatively hydrophilic and relatively hydrophobic silane components) of the invention, the material removal rate after an initial break-in period of 30 seconds showed great advantage of combination-treated grain of the invention relative to grain treated with only a single silane component.

EQUIVALENTS

While this invention has been particularly shown and described with reference to exampled embodiments thereof, it will be understood by those skilled in the art that various changes in form and details may be made therein without departing from the scope of the invention encompassed by the appended claims.

What is claimed is:

1. A surface-modified abrasive grain, comprising:
    a) an abrasive grain; and
    b) a film on the abrasive grain, the film including a relatively hydrophilic silane component and a relatively hydrophobic silane component.

2. The surface-modified abrasive grain of claim 1, wherein the relatively hydrophilic silane component includes at least one compound from at least one member selected from the group consisting of amines, diamines, triamines, azine, azol, ureido, isocyanate, alkoxy, acetoxy, oximino, chloro, morpholinyl and piperazinyl silanes.

3. The surface-modified abrasive grain of claim 1, wherein the relatively hydrophobic silane includes at least one compound from at least one member selected from the group consisting of vinyl silanes, methacrylate silanes, sulfur silanes, mercapto silanes, epoxy silanes and phenyl silanes.

4. The surface-modified abrasive grain of claim 1, wherein the grain is at least one member selected from the group consisting of aluminum oxide, silicon carbide, fused ceramics, alloy abrasives, sol-gels, ceramic grains and super abrasives diamond, corundum, emery, garnet, chert, quartz, sandstone, chalcedony, flint, quartzite, silica, feldspar, pumice, talc, boron carbide, cubic boron nitride, fused alumina, ceramic aluminum oxide, heat treated aluminum oxide, alumina zirconia, glass, silicon carbide, iron oxides, tantalum carbide, cerium oxide, tin oxide, titanium carbide, synthetic diamond, manganese dioxide, zirconium oxide, and silicon nitride.

5. The surface-modified abrasive grain of claim 4, wherein the mean particle diameter is in a range of between about 10 nm and 6 mm.

6. The surface-modified abrasive grain of claim 1, wherein the silane components are polymerized as distinct hydrophilic and hydrophobic polymers, co-polymerized, or block co-polymerized.

7. The surface-modified abrasive grain of claim 1, wherein the weight ratio of the relatively hydrophilic silane component to the relatively hydrophobic silane component is in a range of between about 1:99 and about 99:1.

8. The surface-modified abrasive grain of claim 1, wherein the abrasive grain is seeded sol-gel alumina grain, and the film is a polysiloxane that includes γ-methacryloxypropyltrimethoxy silane as the relatively hydrophobic silane component and 3-aminopropyltriethoxy silane as the relatively hydrophilic silane component.

9. The coated abrasive product, comprising:
   a) a backing layer;
   b) a make coat on the backing layer; and
   c) an abrasive grain component at the make coat, where the abrasive grain component includes abrasive grains surface-modified with at least one relatively hydrophilic silane component and at least one hydrophobic silane component.

10. The coated abrasive product of claim 9, wherein the relatively hydrophilic silane component includes at least one compound from at least one member selected from the group consisting of amines, diamines, triamines, azine, azol, ureido, isocyanate, alkoxy, acetoxy, oximino, chloro, morpholinyl and piperazinyl silanes.

11. The coated abrasive product of claim 9, wherein the relatively hydrophobic silane component includes at least one compound from at least one member selected from the group consisting of vinyl silanes, methacrylate silanes, sulfur silanes, mercapto silanes, epoxy silanes and phenyl silanes.

12. The coated abrasive product of any of claim 9, wherein the grain is at least one member selected from the group consisting of diamond, corundum, emery, garnet, chert, quartz, sandstone, chalcedony, flint, quartzite, silica, feldspar, pumice, talc, boron carbide, cubic boron nitride, fused alumina, ceramic aluminum oxide, heat treated aluminum oxide, alumina zirconia, glass, silicon carbide, iron oxides, tantalum carbide, cerium oxide, tin oxide, titanium carbide, synthetic diamond, manganese dioxide, zirconium oxide, and silicon nitride.

13. The coated abrasive product of claim 12, wherein the mean particle diameter is in a range of between about 10 nm and 6 mm.

14. The coated abrasive product of claim 9, wherein the silane components are polymerized as distinct hydrophilic and hydrophobic polymers, co-polymers, or block co-polymers.

15. The coated abrasive product of claim 9, wherein the weight ratio of the relatively hydrophilic silane component to the relatively hydrophobic silane component is in a range of between about 1:99 to about 99:1.

16. The coated abrasive product of claim 9, wherein the abrasive grain is seeded sol-gel alumina grain, and the film is a polysiloxane that includes γ-methacryloxypropyltrimethoxy silane as the hydrophobic component and 3-aminopropyltriethoxy silane as the hydrophilic component.

17. A bonded abrasive product, comprising:
   a) a bond component; and
   b) an abrasive grain component that includes an abrasive grain and a film over the abrasive grain, the film including a relatively hydrophilic silane component and a relatively hydrophobic silane component.

18. The bonded abrasive product of claim 17, wherein the relatively hydrophilic silane component includes at least one compound from at least one member selected from the group consisting of amines, diamines, triamines, azine, azol, ureido, isocyanate, alkoxy, acetoxy, oximino, chloro, morpholinyl and piperazinyl silanes.

19. The bonded abrasive product of claim 17, wherein the relatively hydrophobic silane component includes at least one compound from at least one member selected from the group consisting of vinyl silanes, methacrylate silanes, sulfur silanes, mercapto silanes, epoxy silanes and phenyl silanes.

20. The bonded abrasive product of any of claim 17, wherein the grain is at least one member selected from the group consisting of diamond, corundum, emery, garnet, chert, quartz, sandstone, chalcedony, flint, quartzite, silica, feldspar, pumice, talc, boron carbide, cubic boron nitride, fused alumina, ceramic aluminum oxide, heat treated aluminum oxide, alumina zirconia, glass, silicon carbide, iron oxides, tantalum carbide, cerium oxide, tin oxide, titanium carbide, synthetic diamond, manganese dioxide, zirconium oxide, and silicon nitride.

21. The bonded abrasive product of claim 17, wherein the mean particle diameter is in a range of between about 10 nm and 6 mm.

22. The bonded abrasive product of claim 17, wherein the silane components are polymerized as distinct hydrophilic and hydrophobic polymers, co-polymers, or block co-polymers.

23. The bonded abrasive grain of claim 17, wherein the weight ratio of the relatively hydrophilic silane component to the relatively hydrophobic silane component is in a range of between about 1:99 to about 99:1.

24. The bonded abrasive grain of claim 17, wherein the abrasive grain is seeded sol-gel alumina grain, and the film is a polysiloxane that includes γ-methacryloxypropyltrimethoxy silane as the hydrophobic component and 3-aminopropyltriethoxysilane as the hydrophilic component.

25. A method of grinding or cutting a workpiece, comprising the step of applying to the workpiece an abrasive product that includes a polymerized combination of relatively hydrophilic and hydrophobic silane components.

26. A surface-modified abrasive grain, comprising:
   a) an abrasive grain;
   b) a first film layer on the abrasive grain that includes a relatively hydrophilic silane component; and
   c) a second film layer over the first film layer that include a relatively hydrophobic silane component.

27. The coated abrasive of claim 26, wherein at least one of the first and second film layers are polymerized.

28. A coated abrasive article, comprising:
   a) a backing;
   b) a make coat on the backing; and
   c) an abrasive component at the make coat, the abrasive component including an abrasive grain, a first film layer on the abrasive grain that include a relatively hydrophilic silane component, and a second film layer over the first film layer that includes a relatively hydrophobic silane component.

29. The coated abrasive product of claim 28, wherein at least one of the first and second film layers are polymerized.

30. A bonded abrasive product, comprising:
a) a bond; and
b) an abrasive component at the make coat, the abrasive component including an abrasive grain, a first film layer on the abrasive grain that includes a relatively hydrophilic silane component and a second film layer over the first film layer that includes a relatively hydrophobic silane component.

31. The bonded abrasive of claim 30, wherein at least one of the first and second film layers are polymerized.

* * * * *